July 13, 1937.  N. L. DERBY  2,086,857
METHOD OF MAKING BIMETALLIC ELEMENTS
Filed Sept. 9, 1935  3 Sheets-Sheet 1
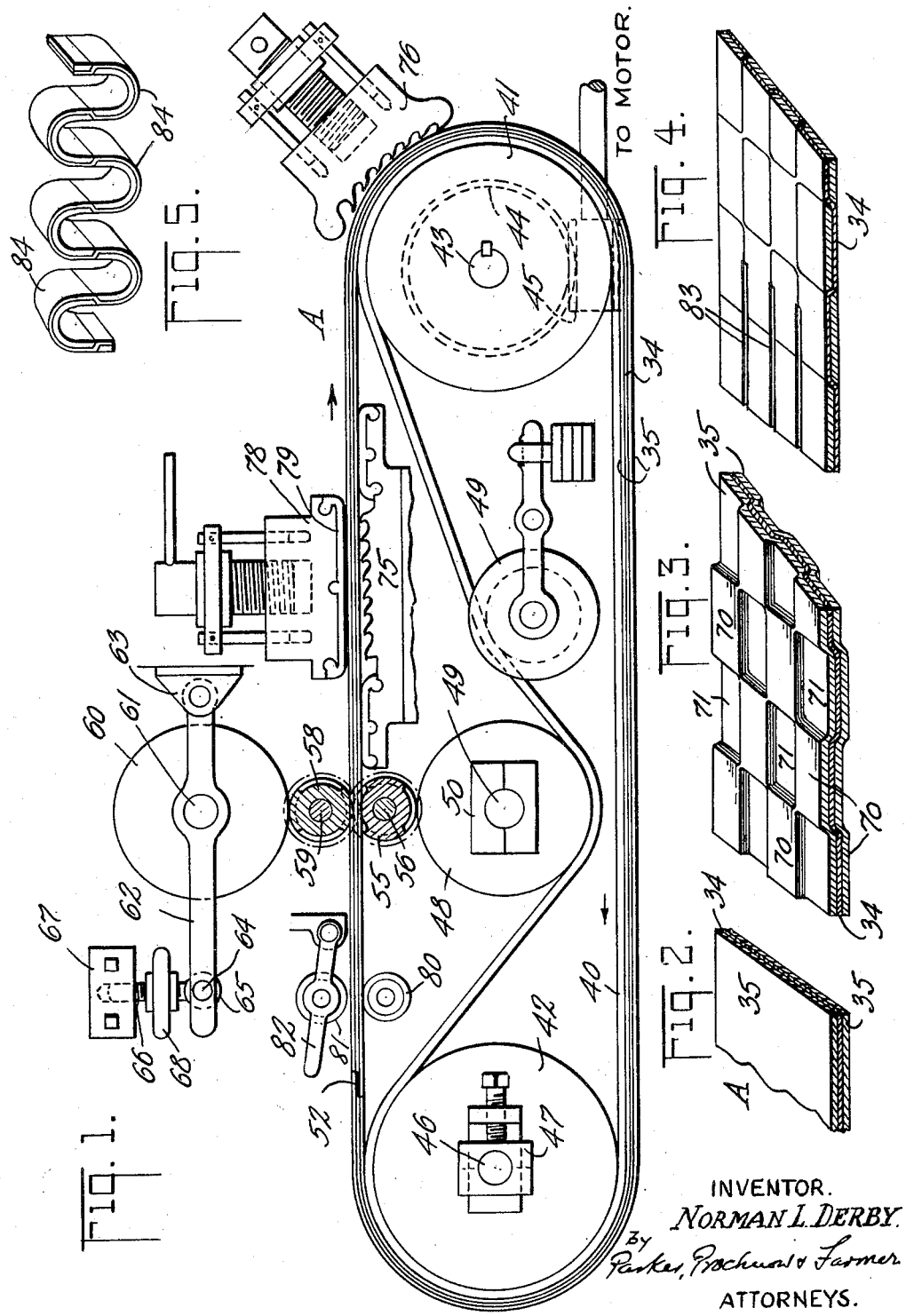
INVENTOR.
NORMAN L. DERBY
By Parker, Brockwood & Farmer
ATTORNEYS.

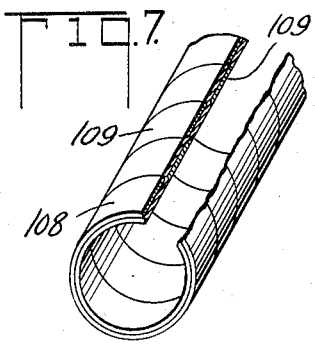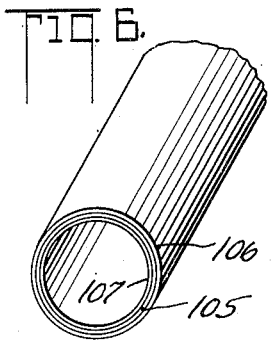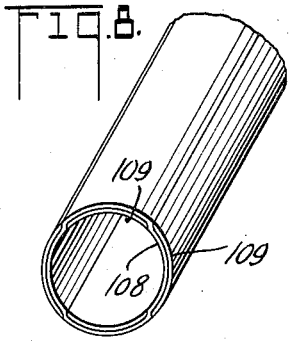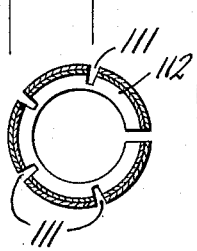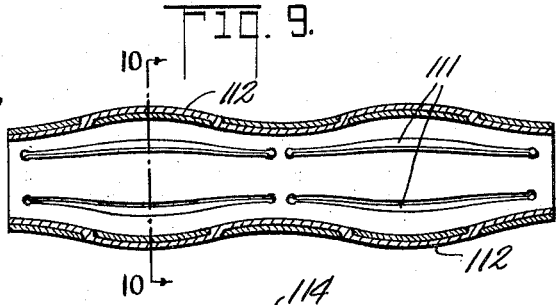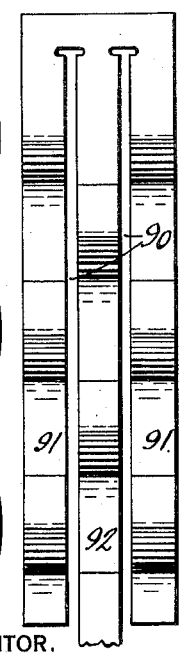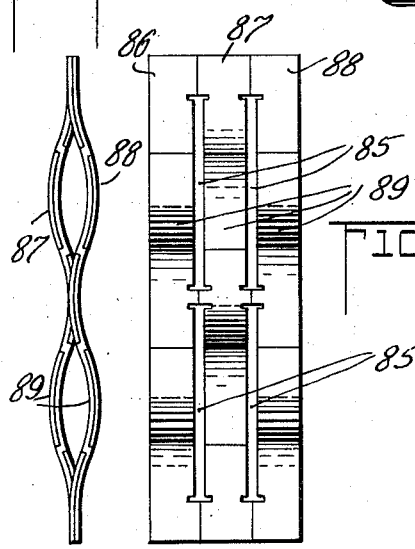

July 13, 1937.   N. L. DERBY   2,086,857
METHOD OF MAKING BIMETALLIC ELEMENTS
Filed Sept. 9, 1935   3 Sheets-Sheet 3
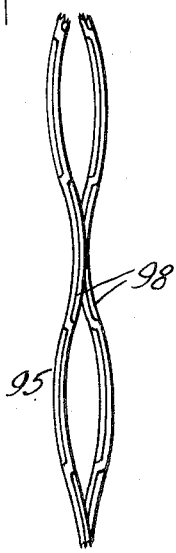
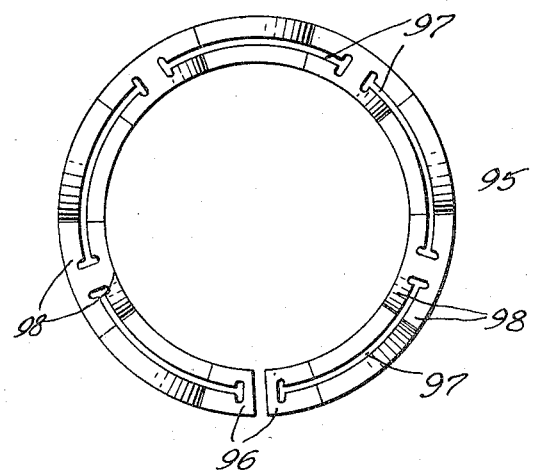
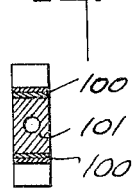
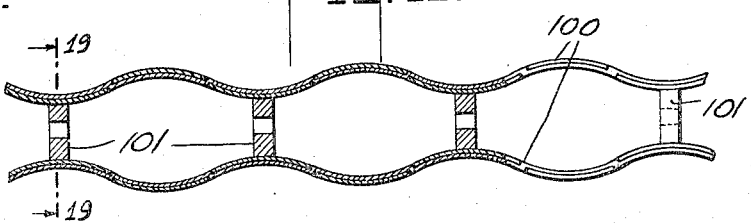
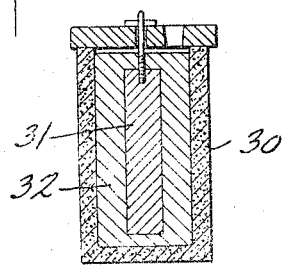
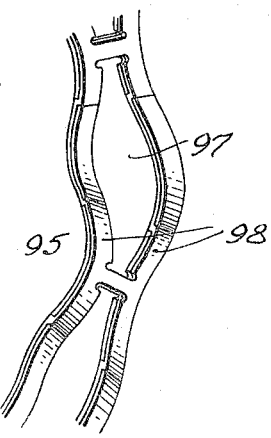
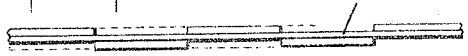
INVENTOR.
NORMAN L. DERBY
BY
ATTORNEYS.

Patented July 13, 1937

2,086,857

UNITED STATES PATENT OFFICE 2,086,857

METHOD OF MAKING BIMETALLIC ELEMENTS

Norman L. Derby, Philadelphia, Pa.

Application September 9, 1935, Serial No. 39,697

10 Claims. (Cl. 29—148)

This invention relates to improvements in methods of producing reversed bimetallic structures which may be employed for example, as thermostatic elements. Elements of this general character are disclosed in the following U. S. Letters Patents issued to me, namely No. 1,983,269, Dec. 4, 1934, and Nos. 1,991,495 and 1,991,496, Feb. 19, 1935, to which reference may be had for a detailed description of the various forms of such elements as are therein disclosed. The elements will henceforth be referred to as reversed bimetals because the high and low sides are reversed in adjacent portions. By high or low side is meant the side on which the metal having the high or low coefficient of heat expansion is located.

Such elements are of especial usefulness when employed as the motor element in automatic valves, electric contacts and temperature indicators wherein they act in response to temperature changes. Reversed bimetals, by reason of their design give more power, truer straight line motion and greater sensitivity with less vibration than the standard cantilever or coil types, and are therefore, often more efficient for a given application. Furthermore, bimetallic elements of the reversed bend type can be designed with special characteristics impossible to duplicate with the standard types.

Heretofore, the higher manufacturing costs and the difficulty of making reversed bimetals accurately and uniformly on a production basis has retarded the more general use of this type. Also it has been difficult to produce these elements with the required structural strength when made very thin for greater sensitivity.

In fabricating corrugated or reversed bend bimetals one method formerly employed was to preform the element by joining sections of high expansion metal alternately to opposite sides of a continuous strip of low expansion metal by means of riveting, brazing or welding. The finished product thus produced had the appearance but not the structural characteristics of the elements made in accordance with this invention.

Other ways of uniting the two metals have included that of recessing a continuous strip of one metal alternately on opposite faces and filling the recesses with pieces of another metal, and permanently securing the elements and finishing the structure by rolling or the like.

A modification of the above process was to join alternate recessed strips of low and high expansion metals to produce a level composite strip. The strip thus formed was subsequently reduced by rolling to form a thin sheet suitable for making reversed bend elements.

None of the elements produced by any of the above or other methods had the high degree of structural uniformity necessary for accurate instrument application, and they were not readily applicable to quantity production. Very thin elements could not be satisfactorily produced. Surface cracks developed because the rolling tended to weaken the vertical joints in the outer surface layers, and as the strip was rolled thinner and thinner the joint weakness developed into surface cracks. This was a serious handicap when it is considered that most of the finished reversed bend elements are reduced to almost paper thinness or from .010" to .020" to give the necessary sensitivity. When a pre-formed composite strip or ingot having outer surfaces consisting of alternate layers of different metals is reduced to a thin sheet by severe rolling, surface cracks almost invariably develop.

I have found that I can readily produce on an economic production basis reversed bimetals having the required structural uniformity by first forming a three layer composite wrought structure consisting of a continuous center member or strip of one metal permanently sandwiched between two continuous outer members or strips of another metal having a widely different heat expansion characteristic than the said center member and removing in any suitable way outer metal alternately and in staggered order from opposite sides of the composite structure.

An object of the present invention is to provide an improved method of making bimetallic elements of the character stated by the use of which the above and other disadvantages and faults due to the use of previous methods have been eliminated, together with a comparative reduction in the cost of producing such elements.

Another object is to provide a method by which reversed bimetallic elements are produced which have a high degree of structural uniformity, with stronger union between the two metals, especially along the transverse joints, elimination of surface cracks, and in which the elements are more compact and homogeneous and have a first class surface appearance; and by which the elements produced are of great accuracy and sensitiveness and consequently are very reliable and efficient in use.

Another object is to produce a method conforming to commercial production standards in that bimetallic elements of the sort described can be produced thereby repeatedly in any quantity exactly to any predetermined or required size or form.

Another object is to provide a practical method by which reversed bimetallic elements can be economically and quickly produced in quantity from a composite strip, sheet or member which is initially in the form of a three layer ingot formed of a continuous layer of one metal disposed between and in continuous union with two outside parallel layers of another metal; also to include in a method for forming reversed bimetallic strips that step by which portions of such a composite strip, sheet or member are embossed or offset on opposite sides and in staggered order for the purpose of enabling these offset or embossed portions to be removed in any suitable manner to expose the underlying middle layer of metal.

Various other objects and advantages of the invention will be apparent from the following disclosure, and the novel features thereof will be set forth in connection with the appended claims.

Fig. 1 is a diagrammatic illustration of an apparatus upon which an embodiment of my invention may be carried out.

Fig. 2 is a fragmentary perspective view of a portion of a composite three layer strip, sheet or member from which bimetallic elements may be produced in accordance with the invention.

Fig. 3 is a similar view showing the member of Fig. 2 after it has received the embossing step, according to my novel method.

Fig. 4 is a portion of a composite strip or member which has been passed through the apparatus and partially severed into individual strips.

Fig. 5 is a perspective view of one of such individual strips bent into corrugated form and representing one type of completed reversed bimetal element formed by the practice of my improved method.

Fig. 6 is a perspective view of a piece of three layer composite tubing which may be used for making tubular thermal elements in accordance with this invention.

Fig. 7 is a perspective view partly in section of a partly completed bimetal element formed from the tubing of Fig. 6.

Fig. 8 is a perspective view of a completed bimetal element formed from the tubing of Fig. 6.

Figs. 9 and 10 are front and side sectional elevations respectively of an open side tubular bimetal element formed by the employment of my novel method, Fig. 10 being on line 10—10, Fig. 9.

Fig. 11 is a perspective view of a helical bimetal element produced from the element of Fig. 8.

Figs. 12 and 13 are front and side elevations respectively of a slotted strip type bimetal element.

Figs. 14 and 15 are the front and side elevations respectively of another slotted strip type bimetal element.

Fig. 16 is a face view of a corrugated bimetal element designed to give angular motion in a horizontal plane.

Fig. 17 is a developed side elevation of a portion of the above element.

Fig. 18 is a side elevation partly in section of a column type bimetal element.

Fig. 19 is a cross section thereof, on line 19—19, Fig. 18.

Fig. 20 is a cross sectional elevation of a composite ingot positioned in a refractory mold.

Fig. 21 is a perspective view of a portion of the element shown in Figs. 16 and 17, looking at the element from the under side.

Fig. 22 is a front edge view of a modified construction of a finished bimetal element, constructed in accordance with one embodiment of my novel method.

In the practice of my improved method of making reversed bimetal elements in its simplest form, I form or take a three layer composite rolled strip consisting of a center member of low expansion metal, such as invar, permanently sandwiched between outer members of high expansion metal such as bronze or brass, and coat alternate or spaced portions of the strip on one side with a protective coating of asphalt varnish and the intervening portions on the opposite side, that is, those portions between those coated on the first side, are also coated with the asphalt varnish. When dry the strip is dipped into a bath of etching fluid such as a solution of nitric acid in water having a specific gravity of 1.2. The acid etches off or removes the bronze where the strip is not coated with varnish, and has little or no effect on the invar.

After etching, the strip is thoroughly rinsed in water and the asphalt varnish is removed with turpentine. The bimetal element formed as above consists of a continuous web of invar having sections of bronze joined alternately to opposite sides, i. e. the high and low sides are reversed in adjacent portions, as illustrated in Fig. 22 which is a view of a finished element made as just explained.

While in most cases it may be desirable to bend the element of Fig. 22, as about to be explained, the element just described may be actually used as a finished product, since at a given specific temperature it will remain flat, as shown, yet upon a change from that temperature, the strip will automatically assume a corrugated form, due to the different expansion properties of the two metals of which the strip is made, as will be obvious.

While the above embodiment of the process is well suited for the economical production of small quantities I prefer to use a more practical embodiment of the process for making large quantities of identical elements to predetermined dimensions on a production basis. In general this consists in embossing, raising, or offsetting alternate spaced portions of the composite rolled strip on opposite sides thereof and removing metal from the embossed portions by any suitable means in a continuous or semi-continuous manner.

The removal of the embossed portions leaves the strip in the form of an approximately level, continuous bimetal element of uniform thickness, having a unitary or continuous web of invar alternately recessed on opposite sides, and with the recesses filled with bronze.

After the embossed portions have been removed the strip may be cold rolled to reduce the thickness and to increase the strength. This cold rolling or secondary rolling operation is sometimes omitted.

The finished strip is finally bent by hand or otherwise fabricated into the desired structural form so that it will warp in a predetermined manner in response to a change in temperature.

The three layer strip or ingot used in my method of forming reversed bimetal elements can be made in any suitable way. I prefer, however, to form a strip, sheet or member, such as is shown in Fig. 2, using bronze as the high expansion member and invar as the low expansion member, in accordance with the procedure shown diagrammatically in Fig. 20. I may use for this purpose a suitable refractory mold 30 and suspend in this mold a thick slab of hot rolled invar 31 coated with a heavy layer of flux, such as borax. The slab is then heated in the mold to about 1850° F. Molten bronze is next poured completely around the suspended slab of invar as indicated at 32 and the contents reheated to above the melting point of the bronze to make sure that the invar has reached the temperature required for the bronze to tin or wet the surface of and become firmly welded to the invar. To assist in the welding process the molten bronze should be thoroughly deoxidized with sodium zinc alloy just prior to pouring it around the invar. As soon as the bronze has solidified, the composite ingot is rapidly cooled to prevent deep penetration of the bronze into the invar.

Due to the difference in the heat expansion of the invar and the bronze, the bronze, when cooling down to room temperatures, exerts an enormous pressure on the invar core. This pressure gives a much stronger union between the two metals than would otherwise be the case.

After the ingot has been cooled and removed, it is preferably rolled down to the required thickness by any standard rolling or other method well known in the art. The ingot may, for example, be reduced by cold rolling or hot rolling or partly by hot and partly by cold rolling depending on the composition of the metals used.

After the desired rolling operations have been completed, a relatively thin, wide strip, sheet, or member A, such as shown in Fig. 2, results having therein a core or layer of invar or other low expansion metal 34 firmly united to two outer layers 35 of bronze or other high expansion metal.

Subsequent steps of my method are designed to transform the wide strip or sheet A into a plurality of narrow strips or ribbons of stock material which may then be bent or formed into bimetal elements of a desired shape.

An apparatus suitable for performing these steps of my method, upon the composite strip A is illustrated in Fig. 1 and includes an endless belt or web 40 suitably mounted upon a pair of spaced pulleys 41 and 42, the pulley 41 being mounted upon a shaft 43 suitably driven. For example, the shaft may have thereon a worm wheel 44 meshing with a worm 45 operatively connected to a motor or other source of power (not shown).

The other pulley 42 is secured upon a shaft 46 which is mounted in adjustable bearings 47 so that it may be moved towards and from the pulley 41 for the purpose of applying tension to the belt 40.

The upper run of the belt between the pulleys 41 and 42 is passed under a suitable friction drive roll 48 which it revolves, and over a weight controlled take up pulley 49. The drive roll 48 is mounted upon a shaft 49 journalled in fixed bearings 50. When the apparatus is to be used I secure about the pulleys 41 and 42 and the belt 40 a section of the composite metal strip A which is to be worked upon by passing the same around the outer sides of the belt 40 where it passes over the pulleys and along the under run of the belt and then bringing the two end portions together in a straight run at the upper side of the pulleys, as shown in Fig. 1, so that the extremities of the strip may be secured together by welding or otherwise, as indicated at 52. This procedure is carried out while the apparatus is stationary and the bearing 47 has been retracted to slacken the belt 40 to some extent. After the strip A has been mounted and secured, as described, the bearing 47 is adjusted to apply tension to the belt 40 and to the endless strip A mounted about the same.

Directly above the friction roll 48 I mount suitable means for deforming the strip such as an embossing roll 55 secured upon a shaft 56 so that the lower side of this embossing roll may frictionally engage and be driven by the roll 48. The upper side of the embossing roll 55 is engageable with the lower face of the upper run of the strip A while a similar and complementary embossing roll 58 on a shaft 59 is arranged directly over the lower embossing roll 55 so as to be engageable with the upper face of said run of the strip A. Arranged above and engageable with the upper embossing roll 58 is a pressure roll 60 mounted upon a shaft 61 carried upon a movable fork or arm 62, one end of which is pivotally secured to a fixed bracket 63. The other end of the arm 62 is secured by a pivot 64 to an eye 65 on the lower end of an adjusting screw or member 66. The upper end of the screw 66 engages in a threaded hole in a stationary socket member 67 and the screw 66 is provided with a handwheel 68 by turning which it will be obvious that the pressure roll 60 can be moved upwardly and downwardly into and out of engagement with the upper embossing roll 58. By appropriate adjustment, the embossing roll 58 may be forcibly moved towards and into operative relation with the lower embossing roll 55. Rolls 55, 58 are suitably geared to maintain the embossing portions in register.

Each of the embossing rolls 55 and 58 have on their faces suitable interfitting or mating projections and recesses which, when suitable pressure is applied, causes these rolls to forcibly engage and deform the successive portions of the strip A as it passes between said rolls and to produce on the strip A a series of spaced alternating and staggered projections or offsets 70 and recesses or depressions 71 on opposite sides of the strip A, as clearly shown in Fig. 3. The movement of the strip A between the embossing rolls helps to drive these rolls.

In this way the formerly straight, continuous invar core is forced outwardly with the coincident bronze portions towards opposite sides of the element so that the outer faces of the forced out portions of the core are disposed approximately in the plane of the outer faces of what now are depressed portions 71 of the outer or bronze layers.

Other embossing means suitable for the particular elements to be produced may be substituted for the embossing means shown in Fig. 1, as will be later mentioned, without departing from the principles of the method of this invention.

The next step in the method of forming the bimetal elements is to remove from the strip embossed as required, the raised spaced portions 70 of bronze so as to expose the adjacent, underlying faces of the invar core. Any suitable cutting or grinding means may be provided for doing this, that shown in the apparatus of Fig. 1 being in the form of a pair of broaches or cutting tools 75 and 76 respectively. The broach 75 is arranged at the lower or inner side of the upper run of the strip A in position to operate upon a side of the strip A after it has left the embossing rolls. The broach 75 includes a series of teeth or cutting elements arranged to progressively shave off portions of the struck out or embossed parts 70 to remove all of the bronze in those areas.

I arrange at the other side of the strip in opposition to the broach 75 an adjustable pressure device 78 of any suitable construction formed to be moved into engagement with the strip and hold it firmly against the broach 75. Preferably, the pressure device 78 is provided with a suitable anti-friction shoe 79 for engagement with the embossed strip.

The other broach 76 is provided with cutting teeth or members similar to the broach 75 and is disposed to similarly engage and operate upon the outer face of the embossed strip A as it passes over the pulley 41 and the adjacent portion of the belt 40 to remove the bronze from the embossed portions at that side of the strip. In this instance the pulley 41 forms an abutment or stop towards which the broach 76 may be adjusted by a screw device similar to that used in the pressure device 78, whereby the strip is firmly held during the broaching operation.

After the embossed strip A has been presented to and has passed by the two broaches 75 and 76, and the embossed portions 70 have been removed, the strip will be substantially as shown in the right-hand portion of Fig. 4, that is with portions of the invar core exposed alternately at opposite sides thereof and in staggered relation as regards one row with the next.

For producing certain forms of the elements, I may now divide the strip A lengthwise either completely or partially, into individual elements or relatively narrow ribbons and this can be done, as shown in the apparatus of Fig. 1 by presenting the strip after it has passed the broaches to cutting or slitting rolls or devices of any suitable form. Cutting rolls 80 and 81 in the form of rotatable arbors having thereon suitable cutting knives or discs are shown, and these are disposed in the proper location to sever the strip. The arbor for the lower cutting roll 80 may be on a fixed axis while that of the other roll 81 is mounted on a movable arm 82 by which the roll can be moved into and out of operative relation to the roll 80 but at the opposite side of the strip.

Any other suitable means may be provided for dividing the strip lengthwise into individual elements. The result of the cutting operation is illustrated at the left-hand side of Fig. 4, wherein the kerfs 83, when continued toward the right, will completely separate the strip A into four pieces. It should be noted, that for the sake of clearness, the various devices of Fig. 1 are shown for the most part, in an inoperative relation to the strip A, but their operation will be clear from the foregoing description.

While in the foregoing I have described the slitting operation as being subsequent to the embossing operation, these operations may be reversed, if desired.

Also I may interrupt the slitting operation at intervals either before or after the embossing operation to form a series of spaced longitudinal slits in the ingot or strip A, so as to leave the individual ribbons joined together at intervals, thereby providing stock which may be used in the production of items such as are shown in Figs. 12 to 15, and which will be later described.

The steps of the method so far described, result in the production of approximately continuous or level bimetal thermal element stock of uniform thickness comprising a continuous layer of invar alternately recessed on opposite sides with sections of bronze which fill these recesses.

However, I can, if desired, perform some of the foregoing operations upon narrow strips, producing the ribbons directly without the use of the slitting operation.

Such sheet, strip or ribbon stock may have various subsequent operations performed thereon to produce reversed bimetal elements of different forms for different uses. For example, Fig. 5 shows the bimetal strip bent into the form of a corrugated or reversed bend thermal element that will expand or contract longitudinally in response to a change in temperature. The bending can be done in any suitable way. For example, it may be done by hand with the aid of spaced removable pins or by standard corrugating dies in a manner well known, producing corrugations 84.

In fabricating the element of Figs. 12 and 13, I first produce bimetal stock like that shown in Fig. 4, excepting that in this case there will be three instead of four longitudinal rows, and the rotary slitters will not be used. The slots 85 are pierced out, the three legs 86, 87, 88 are then corrugated as shown and finally the elements may be cut to length by a compound die in a punch press, or otherwise. All the corrugations or loops 89 in this element tend to contract longitudinally in response to an increase in temperature. While the expansion characteristics of this element are the same as the element of Fig. 5, it has greater stiffness against vibration and will exert greater force.

Figs. 14 and 15 represent a bimetal element designed for great sensitivity. This strip is also formed from a ribbon of the fabricated stock of Fig. 4 in which open slots or recesses 90 are first formed, after which the outer legs 91 of the element are bent or corrugated so as to match one another. The middle leg 92 is next bent or corrugated in an opposed direction. With this construction temperature decreases cause the outer legs to expand longitudinally in unison while the center leg contracts. In use the ends of the two outer legs are fixed and the end of the center leg is free, so that the motion of the free end of the element will be double that of single corrugated strip such as is shown in Fig. 5.

In Figs. 16, 17, and 21 I have shown a reversed bimetal thermal element of substantially circular form to produce a flat element 95 with the free ends 96 adjacent but out of contact. This member 95 is provided with a series of annular spaced slots 97 so disposed that portions of the element at opposite sides of the slots can be bent or corrugated in opposite directions, as shown clearly in Figs. 17 and 21. The ends of the slots 97 are disposed midway between the ends of the corrugations 98.

A plurality of the elements 95 are preferably fabricated directly from a long ribbon of the composite stock shown in Fig. 2, using the apparatus of Fig. 1 for removing portions of the embossed metal only.

I first take a long strip of composite stock and emboss segments of ring portions, as by the use of a standard embossing die set in an embossing press. The long strip with the series of embossed segments is then assembled into an endless band on the apparatus of Fig. 1 and metal is removed from the embossed portions on both sides by the broaches, as in the case first described. The band may be then slit open laterally, and the slots pierced out. Then by the use of a compound die in a punch press, the excess metal is cut out. Finally the element may be corrugated as shown in Fig. 16 in a separate forming operation. When the operations of Figs. 16 and 17 have been completed a structure having, in effect, an inner and an outer ring is produced.

A change of temperature tending to contract the corrugations in one ring will expand the corrugations in the other ring and the combined effect of the motion of the inner and outer rings is to cause one end of the element to deflect through an arc of a circle in the plane of the element. It should be understood that one end of the device is fixed or attached to the instrument upon which it is to be used.

In Figs. 18 and 19 I have shown what I term a column type of corrugated bimetal element. This element comprises two similarly corrugated strips 100, substantially like that of Fig. 5 which are arranged in opposed relation and joined at intervals by links or blocks 101, as shown. The column type of element will give great power in a longitudinal direction because of the toggle effect produced when an increment of the element between a pair of links tends to straighten out in response to a change in temperature.

Thermostatic elements made from composite tubing and having the general characteristics of the elements heretofore described can also be made accurately and economically by a slight modification of the present process.

In making the tube shown in Fig. 7, for example, a composite thin wall drawn tube, as shown in Fig. 6 is first produced consisting of a central core of invar 105 permanently secured between outer and inner concentric members or layers 106 and 107 of bronze or the like. The apparatus shown in Fig. 1 with a slight modification can be used in the production of these tubular elements. The tubing of Fig. 6 for example, can be placed as a sleeve over a collapsible mandrel having a series of spaced concentric grooves on its surface. As the mandrel is caused to revolve between lathe centers, recesses corresponding to the grooves in the mandrel are forced into the tubing by a properly shaped spinning tool. Metal is then removed from the outer surface between successive recesses by a standard turning tool. The tubing is then removed from the collapsible mandrel, placed in a socket, and mounted on an internal grinder so that the raised portions on the inside of the tubing can be removed.

To produce the bimetal tubular element shown in Fig. 8 from the composite tubing of Fig. 6 diametrically opposite quadrants of the tube are embossed outwardly and the intervening quadrants are embossed inwardly. After embossing, the desired amount of metal is removed by internal and external grinding or cutting operations, as above. Thus the tubular elements of Figs. 7 and 8 consist of respectively continuous substantially cylindrical webs of invar 108 and 109 recessed alternately on opposite sides with sections of bronze 109, 110 which fill the recesses.

In Figs. 9 and 10 I illustrate an open side corrugated tubular bimetal element produced from a somewhat wider strip or single ribbon of the finished bimetal stock of Fig. 4. The longitudinal slots 111 are first pierced, then the strip is coiled laterally into an open side tube and corrugated, as shown at 112.

A helical bimetal coil is shown in Fig. 11 which is produced by slitting along a helical line the element of Fig. 8. This may be done by means of a standard thread cutting tool with the tube mounted on a mandrel between lathe centers. After slitting, the element is stretched out to produce the helical space 114.

Summarizing the foregoing, it will be apparent that all of the various reversed bimetal thermal elements described and illustrated, and many others can all be produced from a three layer ingot or composite sheet formed of metals having the desired characteristics, in accordance with the broad method of removing alternate spaced parts from the outer layers and then bending or forming the resultant stock into the final shape required.

For example, while the forms illustrated in Figs. 9 and 16 have been described as being produced from a single ribbon made in accordance with Fig. 4, the structure of Fig. 14 can also be produced from such a single ribbon, properly slit or divided. Likewise all of the examples shown in Figs. 5, 9, 14, 16 and 18 can, if desired, be produced from a strip, sheet or ribbon formed as illustrated and described in connection with Fig. 22.

Many other variations and alternative uses and forms will suggest themselves as the result of the foregoing description without departing from the spirit of the invention, or the scope of the appended claims.

I claim as my invention:

1. A method of producing bimetal thermal elements from a composite member composed of a layer of a metal of one coefficient of expansion permanently bonded between two layers of another metal having a different coefficient of expansion, which includes the steps of deforming said member to press out spaced bosses upon opposite faces of said member with the bosses on one face alternating with those on the other face, and then removing metal of the outer layers from said bosses.

2. A method of producing bimetal thermal elements from a composite strip composed of a layer of a metal of one coefficient of expansion permanently bonded between two layers of another metal having a different coefficient of expansion which includes the steps of deforming said strip by pressing out portions of said strip alternately upon opposite sides thereof to form alternate bosses and depressions in staggered relation on opposite faces of said strip, and then removing the metal of the outer layers from said bosses to produce a substantially flat strip in which the inner layer is exposed alternately at opposite sides.

3. A method of producing bimetal thermal elements from a composite sheet composed of a layer of a metal of one coefficient of expansion permanently bonded between two layers of another metal having a different coefficient of expansion, which includes the steps of deforming said sheet by pressing out portions of said sheet alternately upon opposite sides thereof to form alternate bosses and depressions in staggered relation on opposite faces of said sheet in a plurality of continuous lengthwise rows side by side with the bosses and depressions in adjacent rows being also in staggered relation, and removing metal of the outer layers from said bosses to produce a substantially flat sheet.

4. A method of producing bimetal thermal elements from a composite sheet composed of a layer of a metal of one coefficient of expansion permanently bonded between two layers of another metal having a different coefficient of expansion, which includes the steps of deforming said sheet by pressing out portions of said sheet alternately upon opposite sides thereof to form alternate bosses and depressions in staggered relation on opposite faces of said sheet in a plurality of continuous lengthwise rows side by side with the bosses and depressions in adjacent rows being also in staggered relation, removing metal of the outer layers from said bosses to produce a substantially flat sheet, and severing said sheet lengthwise between said rows to provide a plurality of individual strips of stock.

5. A method of producing bimetal thermal elements from a composite sheet composed of a layer of a metal of one coefficient of expansion permanently bonded between two layers of another metal having a different coefficient of expansion, which includes the steps of deforming said sheet by pressing out portions of said sheet alternately upon opposite sides thereof to form alternate bosses and depressions in staggered relation on opposite faces of said sheet in a plurality of continuous lengthwise rows side by side with the bosses and depressions in adjacent rows being also in staggered relation, removing metal of the outer layers from said bosses to produce a substantially flat sheet, and forming between said rows a plurality of longitudinal spaced slits, bending the stock between said slits outwardly into alternate and staggered arcuate sections which extend in opposite directions in adjacent rows.

6. A method of producing bimetal thermal elements which includes the steps of permanently bonding a layer of a metal having one coefficient of expansion between two layers of another metal having a different coefficient of expansion to form a composite sheet, pressing out portions of said sheet alternately at opposite sides thereof to form alternate bosses and depressions in staggered relation upon opposite faces of said sheet in a plurality of continuous lengthwise rows side by side with the bosses and depressions in adjacent rows being also in staggered relation, removing metal of the outer layers from said bosses to produce a substantially flat sheet, and severing said sheet lengthwise between said rows to provide a plurality of individual strips of stock.

7. A method of producing reversed bimetal thermal elements from a composite sheet composed of a layer of a metal having one coefficient of expansion permanently bonded between two layers of another metal having a different coefficient of expansion, which includes forming slots in said sheet disposed to provide a plurality of laterally arranged sections joined together at intervals, pressing out upon each of said sections spaced embossed portions disposed alternately at opposite sides with said embossed portions of adjacent sections disposed in staggered relation, removing substantially all of the metal of the outer layers from said embossed portions, and then bending said sections to form corrugations thereon in which the metal of the inner layer is exposed on the bends of said corrugations, and extending said corrugations in opposite directions in adjacent sections.

8. A method of producing bimetal thermal elements which includes removing from a composite strip formed of a layer of a metal having one coefficient of expansion permanently bonded between two layers of another metal having a different coefficient of expansion, parts of the outer layers of metal so as to leave substantially disconnected portions thereof upon the inner layer, those portions left on one side of the strip being disposed in staggered relation to those left upon the other side, and severing said strip by parallel cuts to produce a plurality of individual ribbons of stock material.

9. A method of producing bimetal thermal elements which includes removing from a composite strip formed of a layer of a metal having one coefficient of expansion permanently bonded between two layers of another metal having a different coefficient of expansion, parts of the outer layers of metal so as to leave substantially disconnected portions thereof upon the inner layer, disposed in rows, those portions left on one side of each row being in staggered relation to those left upon the other side, and the portions in adjacent rows being also in staggered relation.

10. A method of producing bimetal thermal elements which includes removing from a composite strip formed of a layer of a metal having one coefficient of expansion permanently bonded between two layers of another metal having a different coefficient of expansion, parts of the outer layers of metal so as to leave substantially disconnected portions thereof upon the inner layer, those portions left on one side of the strip being disposed in staggered relation to those left upon the other side and forming rows of parallel slits in said strip to produce a plurality of ribbons side by side which are connected at intervals.

NORMAN L. DERBY.